H. S. JEWELL & F. STEELE.

Improvement in Safety-Valves.

No. 4,892. Reissued May 7, 1872.

Witnesses,

Chas H Smith

Geo. D. Walker

Inventors

Herbert S. Jewell

Ferdinand Steele

Lemuel W. Serrell

AM. PHOTO-LITHOGRAPHIC CO. N.Y. (OSBORNE'S PROCESS.)

UNITED STATES PATENT OFFICE.

HERBERT S. JEWELL AND FERDINAND STEELE, OF BROOKLYN, NEW YORK.

IMPROVEMENT IN SAFETY-VALVES.

Specification forming part of Letters Patent No. 123,176, dated January 30, 1872; reissue No, 4,892, dated May 7, 1872.

Specification describing a new and Improved Safety-Valve and Alarm, invented by HERBERT S. JEWELL and FERDINAND STEELE, both of Brooklyn, in the county of Kings and State of New York.

Before our invention alarms and safety-valves had been arranged so that the valve, when fully opened by an excess of pressure, would be held in that position regardless of the decrease of pressure, and require personal attention before it could be returned to a normal position. This, however, has been accomplished by levers and toggles, requiring considerable space and difficult to inclose, so as not to be under the control of the engineer, or else by means of a spring, the resisting base of which was removed so as to prevent the spring acting against the valve. The present invention consists in a safety or alarm valve within a case, and pressed to its seat by a weight that is direct-acting, and provided with latches or sustaining mechanism that holds the entire weight or a portion thereof in an elevated position when an excess of pressure occurs in the boiler. Thereby the valve is either held entirely open, or the operative pressure-point of the valve lessened.

Figure 1:
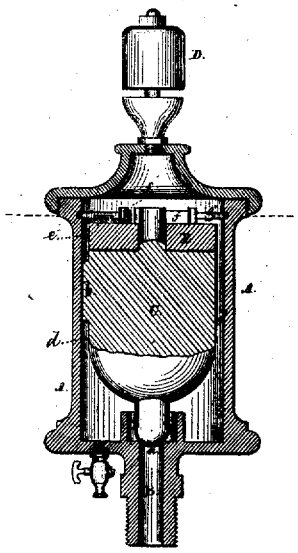
Figure 2:
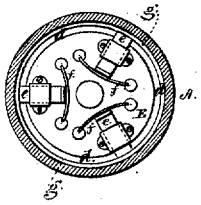

In the drawing, Figure 1 is a vertical, and Fig. 2 a horizontal section of our improved safety-valve.

A represents the valve-chamber, of cylindrical or other form. Its lower end is connected with the steam-pipe B that projects from the boiler. C is the valve, placed within the chamber, and so shaped at the lower end as to nicely fit its seat *a* at the upper end of the pipe B. D is the alarm-whistle or instrument placed on top of the chamber A. This valve C is smaller in diameter than the interior of the chamber A, and has three or more guides or ribs, *b b*. Betweeen the ribs *b* are spaces *d d*, in which the steam can ascend to the whistle D whenever the valve is open. The valve is made of a certain weight, to be raised only when a certain allowed degree of pressure in the boiler is exceeded. It may receive sectional or removable weights, to be thereby regulated with exactness. Upon its top is placed a weight, E, which rests loose. On the upper surface of the weight E are sliding bolts *e e*, which are, by springs *f f*, pressed against the interior of the chamber A. When, by an excess of pressure, the valve is raised sufficiently high to bring the bolts *e e* in line with an inner groove, *g*, or catch in the chamber A, the bolts will be thrown into the groove or catch *g* and hold the weight E suspended. This will relieve the valve from the weight E and reduce the pressure capacity of the boiler. The bolts *e* and spring *f* may, if desired, be applied to the valve direct to hold it bodily suspended when once elevated. Thus, for example, when an inspector has ascertained that a certain boiler can with safety only carry, say, thirty pounds of steam-pressure, he will regulate the weight of valve C accordingly and lock the chamber A. If the engineer, by negligence, permits the pressure to exceed thirty pounds, the valve will be raised and the whistle blown. Immediate steps to reduce pressure will restore the valve to its former position; but if the excess of pressure is continued the valve will be elevated sufficiently high to bring the bolts *e* in line with the groove *g* with stated effect; then either the entire valve will be held elevated and the alarm continuously sounded, or at least the weight E will be detached, and say five or ten pounds deducted from the pressure to be carried. This, of course, will cripple the engine until the inspector shall have restored the former position of the valve, and at the same time have collected the penalty for the negligence of the engineer, which has been so effectively recorded.

We do not claim a safety-valve with a weighted lever that is sustained when the maximum pressure has been exceeded, nor a spring that is relieved under similar circumstances.

We claim as our invention—

A safety-valve and direct-acting weight within an inclosing-case, in combination with mechanism, substantially as specified, that supports the whole or a portion of the weight when an excess of pressure operates upon the valve, substantially as set forth.

Signed by us this 6th day of March, A. D. 1872.

HERBERT S. JEWELL.
FERDINAND STEELE.

Witnesses:
GEO. T. PINCKNEY,
CHAS. H. SMITH,